US012345385B1

(12) United States Patent
Darlage et al.

(10) Patent No.: US 12,345,385 B1
(45) Date of Patent: Jul. 1, 2025

(54) ILLUMINATED COMPONENT WITH AN ELECTROLUMINESCENCE LIGHT SOURCE

(71) Applicant: Valeo Vision, Bobigny (FR)

(72) Inventors: Colby Darlage, Troy, MI (US); Robert Fraizer, Auburn Hills, MI (US)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/906,653

(22) Filed: Oct. 4, 2024

(51) Int. Cl.

| | |
|---|---|
| ***F21S 41/50*** | (2018.01) |
| ***F21S 41/10*** | (2018.01) |
| ***F21S 41/25*** | (2018.01) |
| ***F21V 9/40*** | (2018.01) |
| ***F21V 23/00*** | (2015.01) |

(52) U.S. Cl.
CPC ............... *F21S 41/50* (2018.01); *F21S 41/10* (2018.01); *F21S 41/25* (2018.01); *F21V 9/40* (2018.02); *F21V 23/003* (2013.01)

(58) Field of Classification Search
CPC . F21S 41/50; F21S 41/25; F21S 41/10; F21V 9/40
See application file for complete search history.

(56) References Cited

U.S. PATENT DOCUMENTS

| | | | |
|---|---|---|---|
| 3,274,419 A | 9/1966 | Roth | |
| 6,926,972 B2 | 8/2005 | Jakobi et al. | |
| 6,965,196 B2 | 11/2005 | Murasko et al. | |
| 7,698,842 B2 | 4/2010 | Fitzke et al. | |
| 8,314,546 B2 * | 11/2012 | Tchakarov | G02B 6/006 313/504 |
| 8,470,388 B1 | 6/2013 | Zsinko et al. | |
| 9,855,888 B1 * | 1/2018 | Dellock | F21S 43/33 |
| 10,281,113 B1 * | 5/2019 | Salter | B60R 19/483 |
| 11,533,793 B2 | 12/2022 | Rogers et al. | |
| 2005/0067952 A1 | 3/2005 | Fechter et al. | |
| 2010/0209724 A1 | 8/2010 | Hartmann et al. | |
| 2013/0313542 A1 | 11/2013 | Hakii et al. | |
| 2015/0291085 A1 * | 10/2015 | Manning | B60Q 1/0408 362/546 |
| 2015/0307033 A1 * | 10/2015 | Preisler | B60Q 3/20 296/1.08 |
| 2017/0341571 A1 * | 11/2017 | Salter | B60Q 1/323 |

* cited by examiner

*Primary Examiner* — Christopher E Dunay
(74) *Attorney, Agent, or Firm* — Young Basile Hanlon & MacFarlane, P.C.

(57) ABSTRACT

An illuminated component comprising: an outer lens, a first layer, a second layer, a third layer, a first electrode, and a second electrode. The outer lens forms an outside of the illuminated component. The first layer is disposed on a back side of the illuminated component. The second layer is disposed on the first layer to at least partially cover the first layer. The third layer is disposed on the first layer, the second layer, or both divided into a first portion and a second portion. The first electrode is connected to the first portion. The second electrode is connected to the second portion so that when power is applied, the power flows between the first electrode and the second electrode through the second layer so that the second layer generates light that is visible on an exterior of a vehicle housing the illuminated component.

20 Claims, 4 Drawing Sheets

ILLUMINATED COMPONENT WITH AN ELECTROLUMINESCENCE LIGHT SOURCE

FIELD

The present teachings relate to an illuminated component with a large surface area that is illuminated from a rear side of the illuminated component.

BACKGROUND

Vehicles include many different types of lights. Some types of lights included on a vehicle are low beam headlights, high beam headlights, taillights, turn signal lights, fog lights, running lights, or a combination thereof. Each of these lights extend out of an outer surface of a vehicle so that they provide light for the driver or provide notice to surrounding drivers. These light systems generally direct light outward from the vehicle. Some lights have been provided on vehicles to provide decoration or decorative features around a vehicle.

Thus, there is a need for an illuminated component with a large surface area that is homogeneously illuminated. There is a need for a component and method of producing the illuminated component with a rear side that assists in producing the light that extends through the illuminated component. There is a need for a system and method where the illuminated component is illuminated from a rear side. It would be desirable to have an illuminated component that is protected from a forward surface and illuminates the illuminated component. The present teachings provide a method of producing a light system that is illuminated from a rear side of the light component.

SUMMARY

The present teachings provide: an illuminated component comprising: an outer lens, a first layer, a second layer, a third layer, a first electrode, and a second electrode. The outer lens forms an outside of the illuminated component. The first layer is disposed on a back side of the illuminated component opposite the outside of the illuminated component. The second layer is disposed on the first layer to at least partially cover the first layer. The third layer is disposed on the first layer, the second layer, or both divided into a first portion and a second portion. The first electrode is connected to the first portion. The second electrode is connected to the second portion so that when power is applied, the power flows between the first electrode and the second electrode through the second layer so that the second layer generates light that is visible on an exterior of a vehicle housing the illuminated component.

The present teachings provide: an illuminated component comprising: an outer lens configured to extend outside of a vehicle when the illuminated component is connected to the vehicle; a first layer disposed on a back side of the illuminated component so that the back side faces an interior of the vehicle when the illuminated component is connected to the vehicle; a second layer disposed on the first layer to partially or entirely cover the first layer; a third layer comprising: two or more portions that include a first portion and a second portion, with the two or more portions being disposed on and in contact with a surface of the second layer, the first layer, or both; a first electrode connected to the first portion; and a second electrode connected to the second portion and electrically connected to the first electrode to complete a circuit so that when power is applied, the power flows between the first portion and the second portion through second portion to illuminate the second portion and provide light.

The present teachings provide: a process comprising: applying a first layer to a back side of an outer lens; applying a second layer to a back side of all or a portion of the first layer; applying a third layer to the first layer, the second layer or both such that the third layer comprises two or more portions; connecting a first electrode to a first portion of the two or more portions; and connecting a second electrode to a second portion of the two or more portions to form an illuminated component, and wherein the third layer is powered to emit light.

The present teachings provide an illuminated component with a large surface area that is homogeneously illuminated. The present teachings provide a component and method of producing the illuminated component with a rear side that assists in producing the light that extends through the illuminated component. The present teachings provide a system and method where the illuminated component is illuminated from a rear side. The present teachings provide an illuminated component that is protected from a forward surface and illuminates the illuminated component. The present teachings provide a method of producing a light system that is illuminated from a rear side of the light component.

DETAILED DESCRIPTION

Figure 1A:
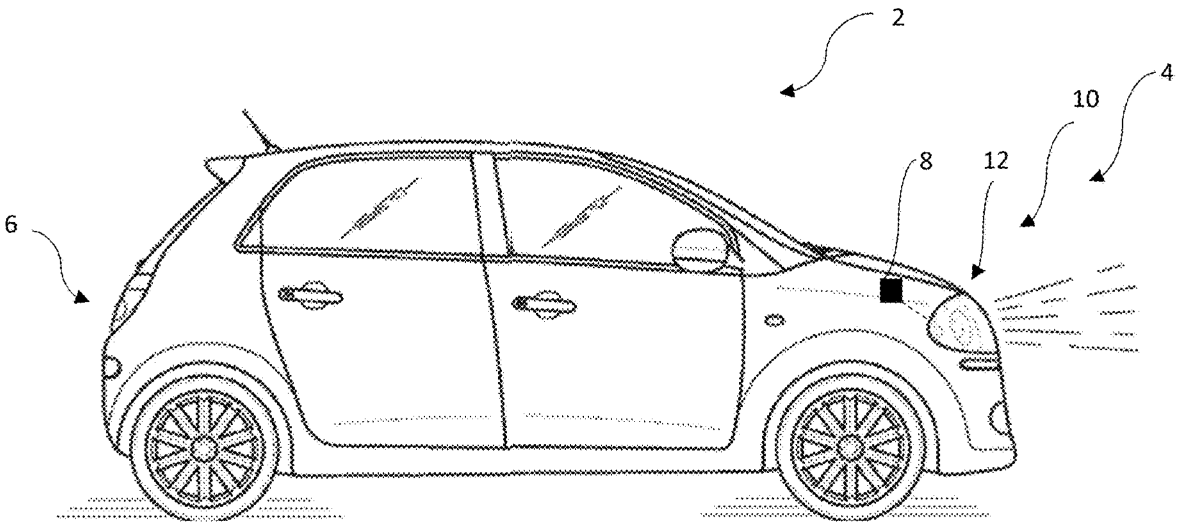
FIG. 1A is a side view of a vehicle including a light system.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings relate to a light system. The light system is located within a vehicle. Preferably, the light system is part of a vehicle such as a car, motorcycle, bus, truck, semi-truck, SUV, XUV, four-wheeler, dirt bike, tractor, combine, heavy equipment, farm equipment, industrial equipment, commercial equipment, or a combination thereof. The light system may project light in a forward direction, rear direction, side direction, vertical direction (e.g., z-axis), from a fore to an aft, an aft to a fore, or a combination thereof. Preferably, the light system projects a light from an external surface of the vehicle to a location in front of the vehicle or at an angle relative to the front or rear of a vehicle.

The light system may direct some light at the ground. The light system may direct some light above the ground. The light system may be integrated into a front end, a rear end, or both of a car. The light system may be an assembly. The light system may be a sealed light system that is integrated into a vehicle. The light system may be a sub-assembly that is included in a larger light system. The light system may be integrated into another light system and may function to be part of the light system. The light system may be a dual part. The light system may be both a grille and a light. The light system may be a grille that glows, projects light, or both. The light system may project light out of the vehicle. The light system may cause one or more components of the vehicle to illuminate, glow, provide notice, or a combination thereof. The light system may include multiple different lights or light sub-systems that each provide a different function. The light systems may be multiple light systems or light sources stacked one above the other, side by side, within different planes, within a same plane and projecting in different direction, integrated into a single light system, or a combination thereof. The light system may have multiple smaller light systems or light sources. The light system may include a single light source that activates the entire light system so that an entire component is illuminated. The light system may be free of a traditional light system that generates light to pass light out of a component of a vehicle. The light systems may be covered by or include one or more outer lenses. The light system may be free of an outer lens. The light system may be free of a protective outer layer. The light system may include an outer lens that forms an exterior of the light system.

The outer lens may form an outer most surface of the light system. The outer lens may function to protect all or a portion of the light system. The outer lens may be free of covering an illuminated component. The outer lens may be an exterior of an illuminated component. The outer lens may form a substrate or be a substrate. The outer lens may have an outer surface (e.g., "A-side") and an inner surface (e.g., "B-side" or back side). The B-side of the outer lens may be a substrate that holds a coating, layers, an electroluminescence coating, or a combination thereof. The B-side of the outer lens may directly hold all of the layers that form an illuminated component while protecting the layers and allowing light to pass therethrough. The outer lens may cover a light, be part of a light, may be free of covering the illuminated components (e.g., a grille, handle, bumper), may be an outside of an illuminated component, or a combination thereof. The outer lens may be an outer most part of a light system, an illuminated component, or both. The outer lens may be a layer or a substrate of the illuminated component.

The plurality of light systems, lights, illuminated components, or a combination thereof may be located in one light system or one component. The plurality of light systems may operate independently of one another such that one light system may not affect another light system or portion of the light system. The light system (e.g., an illuminated component) may provide light with two or more colors, three or more colors, four or more colors, or a combination thereof. The light system may be component of a vehicle and a light such that the light system provides dual function. The light system may provide signals, symbols, words, images, patterns, ornamentation, decoration, or a combination thereof. The light system may provide an illuminated component or be an illuminated component.

The illuminated component taught herein may be any component of a vehicle that provides light, decoration, notice, conveys a message, or a combination thereof. The light may be provided to illuminate a region around a vehicle, to convey a message, to provide effects around a vehicle, to provide ornamentation, provide decoration, or a combination thereof. The illuminated component may provide one or more, two or more, three or more, four or more, or five or more lights or colors of lights (e.g., wavelengths of light). The illuminated components may be any color on the visible light spectrum. The illuminated components may be white, red, orange, yellow, blue, green, purple, a shade of those colors, or a combination thereof. The illuminated components may project light outward in a pre-determined pattern or shape of any desire. The illuminated components may be a grille, a door handle, a bumper, a fender, a quarter panel, facia, a component made of plastic, or a combination thereof. The illuminated components may be a movable component, a static component, or both. The illuminated component may be on a front, side, rear, wrap between two sides, or a combination thereof of a vehicle. The illuminated component may be a non-structural component. The illuminated components may be part of a light system or may form an entire light system. The illuminated components may provide light that does not provide a lighting function during movement. For example, the light provided by the illuminated component may be entirely decorative. In another example, the illuminated component may operate when the doors are locked, the doors are unlocked, the car is in park, the car not moving, or a combination thereof. The illuminated component may be formed on or within an article of manufacture.

The article of manufacture (e.g., illuminated component) may include a base substrate that the light projects into and out of (e.g., through). The substrate may be a rigid structure (e.g., outer lens) that coatings (e.g., layers) adhere to, are disposed on, coatings are connected to, or a combination thereof. The substrate may be clear or substantially clear.

The substrate may be made of or include a polycarbonate (PC), vinyl, acrylic, polymethyl methacrylate (PMMA), polyethylene terephthalate (PET), amorphous copolyester (PETG), polyvinyl chloride (PVC), polyethylene (PE), ionomer resin, polypropylene (PP), fluorinated ethylene propylene (FEP), Styrene Methyl Methacrylate (SMMA), styrene acrylonitrile resin (SAN), polystyrene, Methyl methacrylate acrylonitrile butadiene styrene (MABS), or a combination thereof. The substrate may have some flexibility (e.g., may elastically deform 1-5 degrees) when contacted without breaking or plastically deforming. The substrate may be rigid. T The substrate may be clear and the coatings may provide coloring. The coloring of the substrate may not change the color of light provided when light extends through the substrate. The coatings may be the only portion of the illuminated component of the that generates color. The substrate (e.g., outer lens) may form any shape discussed herein or may be connected to another device.

The substrate may directly hold and/or contact the coatings disposed thereon. The coatings function to change a color of light when the light contacts the coatings. The coatings may transfer power across the substrate. The coatings may be a plurality of layers that are connected to the substrate and generate light when electricity is applied to the article of manufacture, the vehicle component, or a combination thereof. Thus, the substrate may include a plurality of coatings that each perform a different function to illuminate the vehicle component, the article of manufacture, or both. The coatings may change a color of light when the light contacts the coatings and are reflected by the coatings. The coatings may change a wavelength of the light. Each coating may provide a different color. Thus, if two coatings are present the illuminated component may provide two different colored lights, three different colored lights, or even four different colored lights. The coatings may be the only part of the illuminated component that provide light and/or coloring. The coatings may reflect light. The coatings may reflect light out of the substrate or through the substrate. The coatings may be disposed over another coating to form a light that illuminates when power is applied to the light system. The coatings may be disposed as a solid, a liquid, a powder, or a combination thereof. The substrate may include two or more layers, three or more layers, four or more layers, or even five or more layers applied to the back side. The substrate (e.g., outer lens) may have an electrically conductive layer, a distribution layer, a metal layer, or a combination thereof applied directly onto a B-side. The material on the B-side may be divided into a two or more lights. The two or more lights may include a first light, a second light, and a third light.

The two or more lights may be intertwined, separated, discrete, different colors, same colors, different shapes, different textures, similar textures, or a combination thereof. The two or more lights may be divided into different lights that may discretely operate such that one may be on and one may be off. Thus, if three lights a present the first light, the second light, and the third light may all be on, all be off, or change when they are on and off. The two or more lights may be independently controllable. The lights may be controlled independently such that the lights are turned on and off in a sequence so that the lights appear to be moving. The different lights may form shapes, trademarks, words, symbols, or some other illuminated communication or ornamentation.

The electrically conductive layer may function to distribute electricity across a back side of the outer lens. The electrically conductive layer may be directly disposed on a back side of the outer lens. The electrically conductive layer may substantially cover the entire back side of the outer lens (e.g., 75 percent or more, 85 percent or more, or even 95 percent or more of the surface). The electrically conductive layer may be or include a metal. The electrically conductive layer may include or be made of copper, silver, gold, aluminum, nickel, graphite, graphene, or a combination thereof. The electrically conductive layer may be substantially transparent (e.g., allow some or all of light generated to pass through the electrically conductive layer (e.g., 50% or more, 75% or more, 90% or more)). The electrically conductive layer may spread electricity across the outer lens. The electrically conductive layer may receive power from another layer (e.g., an electrical distribution layer). The electrically conductive layer may be a first layer placed on the substrate. The electrically conductive layer may be identical to the electrical distribution layer. The electrically conductive layer may be different than the electrical distribution layer. The electrically conductive layer may be a first layer and a third layer. The electrically conductive layer may be selectively removed from the outer lens. The electrically conductive layer may be removed so that there are regions where the electrically conductive layer is absent. The electrically conductive layer may be formed into regions or portions. The electrically conductive layer may be formed in a pattern on the outer lens. The electrically conductive layer may be disposed between the outer lens and the light emitting layer.

The light emitting layer functions to produce light when power is applied. The light emitting layer may glow, generate light, radiate light, project light outward, or a combination thereof. The light emitting layer may emit one or more colors, shapes, patterns, images, or a combination thereof. The light emitting layer may generate two or more colors, three or more colors, or more. The light emitting layer may include one or more patterns, two or more patterns, or even three or more patterns. The light emitting layer may be formed to include shapes, symbols, words, letters, numbers, decals, trademarks, names, or a combination thereof. The light emitting layer may include a metal, phosphorous, other substances that when powered may emit light, or a combination thereof. The light emitting layer may generate a color when light contacts or extends into the coating/layer. The light emitting layer may change a color of light when light is reflected by the coatings/layer. The light emitting layer may be made of or include phosphorous, a photochromatic component, silicone phosphor, a chemiluminescence coating, zinc phosphate, chromium, zinc, vanadate, zirconium, manganese, iron, or a combination thereof. The light emitting layer may include phosphor, a host material, and an activator. The light emitting layer may include copper zinc sulfide, silver zinc sulfides, oxides, nitrides, oxynitrides, sulfides, selenides, halides, silicates of zinc, cadmium, manganese, aluminum, silicon, a rear earth metal, nickel, or a combination thereof. The light emitting layer may be fluid or solid before being applied. The light emitting layer may be a sheet or a film that may be adhered to a substrate. The light emitting layer may be a liquid that may be deposited on a substrate. The light emitting layer may be deposited by spraying, painting, rolling, atomizing, airless spraying, electrostatic application, dipping, brushing, or a combination thereof. The light emitting layer may be applied on one or more sides of a substrate. The light emitting layer may be deposited only on the back side (e.g., B-side) of the substrate. The light emitting layer may be applied to a single side of a substrate. The light emitting layer may be dried after being applied. Heat may be applied to the light emitting layer to dry the coatings/layer. The light emitting layer may be dried by ambient conditions. The light emitting layer may be applied to a substrate that is free of a light source. The light emitting layer may cover all or a portion of the back side of the outer lens. The light emitting layer may emit light when power is provided to the light emitting layer. A distance through the light emitting layer from electrode to electrode may be sufficiently small that power can travel from one electrode to another electrode through the light emitting layer. Power may be provided to the light emitting layer via one or more electrical distribution layers.

The electrical distribution layer functions to provide electricity to predetermined locations of the light emitting layer. The electrical distribution layer may have one or more locations where power enters the light emitting layer and one or more locations where power exits the light emitting layer. The electrical distribution layer may include of be formed into two or more portions, three or more portions, or four or more portions. One of the portions may be a negative and one of the portions may be a positive so that power may flow between the negative and the positive. The portions may include two negative portions and one positive portion, or vice versa where the power flows between the two negative portions and the positive portion. As the power flows through the electrical distribution layer into the light emitting layer and back to the electrical distribution layer, the light emitting layer may be excited such that light may be produced. The portions of the electrical distribution layer may be spaced apart such that energy flows from one portion to another portion. A number of portions may vary based upon complexity, color, shape, a number of light emitting layers disposed, portions of the light emitting layers powered, or a combination thereof. The electrical distribution layer may be a metallized layer the conducts electricity. The electrical distribution layer may be a thin film, a paint, a spray, or a combination thereof. The electrical distribution layer may be made of or include silver, copper, aluminum, gold, nickel, or a combination thereof to provide electricity to a predetermined location. The electrical distribution layer may be broken into portions so that the portions may be individually illuminated. For example, one portion may be powered while other portions may remain off depending upon a desired region to be illuminated. The electrical distribution layer may be covered by a dielectric layer and surrounded by an absence of material or an insulating material.

The absence of material functions to prevent electricity from extending from the electrical distribution layer into the light emitting layer. The absence of material may function to force the electricity to spread across the light emitting layer so that substantially all of the light emitting layer illuminates. The light emitting layer may be air, an insulator, a material that electricity cannot extend through, a material that electricity would not flow through over the light emitting layer, or a combination thereof. The absence of material may separate the first layer from the second layer. The absence of material may have a primary portion and a secondary portion.

The primary portion functions to extend coplanar with the electrical distribution layer. The primary portion may fill out a region around the electrical distribution layer. The primary portion may be located between the light emitting layer and the dielectric layer. A secondary portion may extend outward from the primary portion. The second portion may extend from a first layer into a second layer. The secondary portion may extend from a first layer including the primary portion into a second layer. The secondary portion may extend between edges of the light emitting layer and the electrical distribution layer. For example, the absence of material may extends along the first portion and the third portion of the electrical distribution layer (e.g., edges). The first portion and the second portion of the electrical distribution may be separated by an absence of material so that the first portion and the second portion are free of direct contact, indirect contact, or both. The first portion of the third layer (e.g., electrical distribution layer) may be perpendicular to a back side of the lens. The third coating may contact a back side of the second layer and extend parallel to the back side of the outer lens.

The dielectric layer functions to protect the electrical distribution layer, to prevent electricity from extending in an undesired direction, or both. The dielectric layer may encapsulate the layers between the dielectric layer and the outer lens. The dielectric layer may be free of metal, free of conductive material, or both. The dielectric layer may be or include ceramic, plastic, mica, glass, silica based materials, silicate based materials, hafnium silicate, zirconium silicate, barium titanate, alumina, polyvinylidene fluoride, polytetrafluoroethylene, glass, silica, borosilicate glass, or a combination thereof. The dielectric layer may be a sheet, sprayed on, rolled on, or a combination thereof. The dielectric layer may be applied so that the dielectric layer extends over one or more layers (e.g., electrical distribution layer). The dielectric layer may be applied on a layer and extend around other layers or materials. The dielectric layer may extend over an electrical distribution layer, an absence of material, electrodes, or a combination thereof. The dielectric layer may provide a seal. The dielectric layer may be fluid resistant, electrical resistant, or both. The dielectric layer may be a final layer, an inner layer, or both. The dielectric layer may encapsulate all or a portion of an electrode so that power from the electrode is prevented from extending outside of the illuminated component.

The electrodes function to provide power to the light system, the illuminated component, the electrical distribution layer, the light emitting layer, or a combination thereof. The electrodes function to send and receive power to the light system, the illuminated component, the electrical distribution layer, the light emitting layer, or a combination thereof. The electrodes may connect to the light system so that power is provided through the light system to complete a circuit and excite the light emitting layer. The electrodes may include at least a first electrode (negative) and a second electrode (positive). All or a portion of the electrodes may be connected to or surrounded by a fourth layer, a dielectric layer, an electrical distribution layer, or a combination thereof. The electrodes may extend through the dielectric layer so that power passes through the dielectric layer and into the electrical distribution layer to excite the light emitting layer. The electrodes may supply power so that the power flows from a rear side of the illuminated component towards a forward side of the illuminated component to electrify the second layer. The power from the electrodes flows into a backside of the second layer to electrify the second layer. The electrodes may be connected to the electrical distribution lay be gluing, soldering, welding, a mechanical connection, a chemical connection, or a combination thereof. The electrodes may be connected to one or more wires that may permit the flow of electricity through the light, light layers, electrodes, or a combination thereof. The electricity that flows through the wires, electrodes, or both may be alternating current (AC) or direct current (DC). The power may be controlled by resistors, an inverter, pulse width modulation (PWM), or a combination thereof. Any electricity may be provided that excites the coatings, layers, or both so that light is emitted. The PWM may excite the light emitting layer so that light is provided from the light system.

The coatings may be disposed in a predetermined pattern. The coatings may be applied one over the other. A mask may be applied and then a first coating applied. A first coating may be applied and then a portion of the coating may be removed. The coating may be removed by any technique that removes the coating without damaging the substrate. The coating may be removed by ablation, laser remove, scrapping, sanding, wet sanding, or a combination thereof. One of the coatings may generate light and other coatings may provide power to the light generating coating (e.g., electroluminescence coating). The layers discussed herein may be a first layer, a second layer, a third layer, a fourth layer, or a fifth layer. The light system/illuminated component may be connected to one or more controllers.

The controllers function to control the light sources or the lights within a light source individually. The controller may be part of the vehicle, part of the light system, or both. A single controller may control all of the lights. The controller may illuminate (e.g., fire) the lights in a sequence, individually, in a pattern, a predetermined manner, a predetermined sequence, randomly, or a combination thereof. For example, if there are two or more different regions of the light emitting layer, the controller may individually illuminate the regions of the illuminated component. The controller may be programmable, include pre-set programs, or both. The controller may be accessed inside of the vehicle so that the user can change the illumination settings of the light system. The controller may communicate with light sources through one or more printed circuit boards.

The teachings herein create an illuminated component that may be made by one of more steps taught herein. The process may begin by forming or obtaining an article of manufacture. The article of manufacture may be a base article or device that forms a substrate. The base article may be an outer lens. The outer lens may have a front side (A-side) and a rear side (B-side). The substrate may be clear, transparent, translucent, partially opaque, or a combination thereof. The substrate may have a first layer (e.g., coating) applied. A mask may be applied to the substrate. The mask may be removed. The outer lens may be free of a mask. All or a portion of any of the layers may be removed after being applied. One of the layers may be applied then a portion of the layer may be removed. The layer may be removed to generate a pattern, a shape, a word, an image, any other shape herein, or a combination thereof. The layer may be free of removal, masking, or both. Each of the layers may be a complete layer. Some of the layers may be complete layers and some of the layers may be partial layers or partially removed. One of the layers may be a partial layer (e.g., a second layer, a third layer, or both). The first layer may be dried. The first layer may be applied as a liquid, a film, or both.

A second layer may be applied over all or a portion of the first layer. The second layer may be applied over a mask so that when the mask is removed all or a portion of the second layer is removed. The second layer may be applied and then a portion of the second layer removed. The layers may be removed by the techniques discussed herein. The layers may be removed by ablation. The second layer may be a complete layer and may be free of removal. The second layer may be applied in a pattern without masking or removal. The second layer may partially overlap or completely overlap the first layer. The second layer may be free of any overlap with the first layer. The second layer may be directly applied to the first layer. The second layer may cover less than all of the first layer. The second layer may be applied as a liquid, a film, or both.

A third layer may be applied. The third layer may be masked and then the masking removed. The third layer may be applied over a mask. The third layer may be disposed to the first layer, the second layer, or both. The third layer may vary in thickness. The third layer may have regions that are a single layer, regions that are twice as thick as a single layer, or both. The third layer may be applied and then a portion of the third layer may be removed. Once all of the layers are applied the substrate will be an illuminated component. The layers may be dried. The third layer may be applied as a liquid, a film, or both. The third layer may be covered by a fourth layer.

The fourth layer may be applied over a first layer, second layer, third layer, or a combination hereof. The fourth layer may extend over one or more electrodes. The fourth layer may connect the electrodes to the third layer (e.g., electrical distribution layer). The fourth layer may be a non-conductive layer, a dielectric layer, or both.

FIG. 1A illustrates a side view of a vehicle 2 including light systems 10. The light systems 10 provide light around the vehicle 2. The light systems 10 are located at a fore 4 end of the vehicle 2 but could be located at an aft 6 of the vehicle 2. The light systems 10 include an illuminated component 12 such as a grille. The light systems 10 may be controlled by one or more controllers 8 jointly or individually.

Figure 1B:
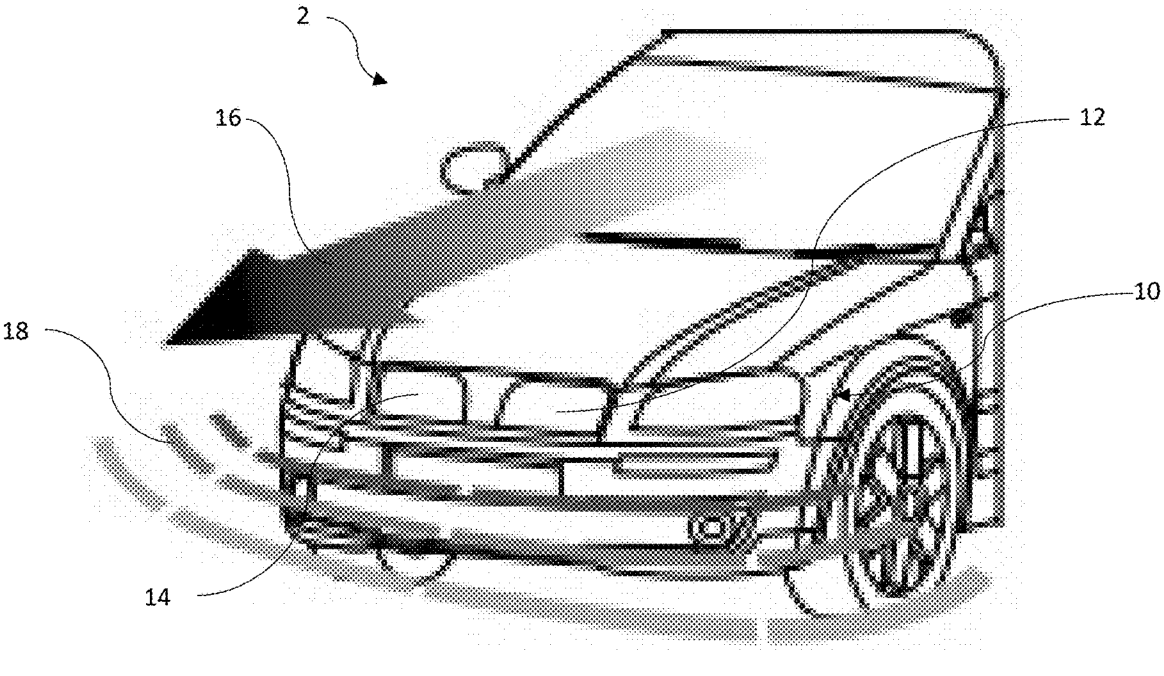
FIG. 1B is a front view of a light system including an illuminated component.

FIG. 1B is a forward end of the vehicle 2. The forward end includes light systems 10 including an illuminated component 12. The illuminated component 12 is shown as a grille of the vehicle 2. The illuminated component 12 includes an outer lens 14 that is an outermost portion of the illuminated component. The illuminated component 12, as shown, faces in a direction of motion 16 and directs light in the direction of motion 16 as shown by the visible light 18 extending away from a forward end of the vehicle 2 (or any other side/end of the vehicle 2 including an illuminated component).

Figure 2:
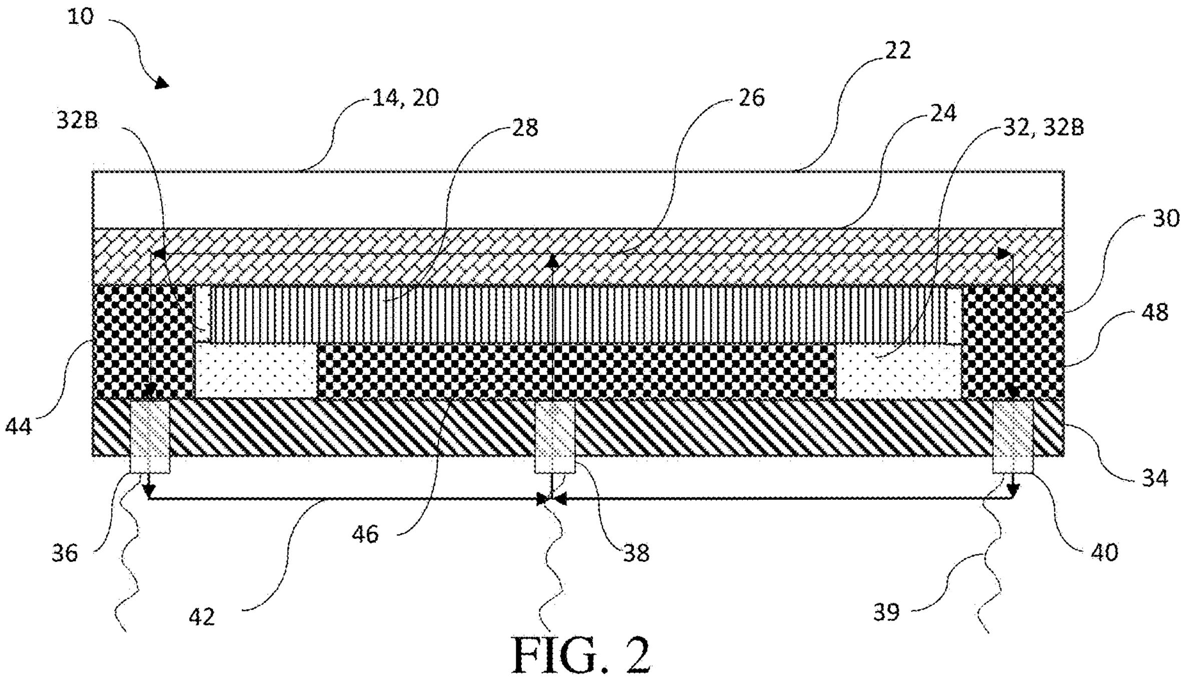
FIG. 2 illustrates a cross-sectional view of an illuminated component.

FIG. 2 is a cross-sectional view of a light system 10. The light system 10 includes a plurality of layers. An outer lens 14 form an exterior of the light system 10. The outer lens 14 has an interior and an exterior (A-side) 22 with the interior (B-side) 24 acting as a substrate 20. The backside 24 of the outer lens 14 includes a distribution layer 26 (e.g., a first layer). The distribution layer 26 is directly disposed on the B-side 24 of the substrate 20. A light emitting layer 28 (second layer) is disposed over a portion of the distribution layer 26. The light emitting layer 28 produces light when power is supplied to the light emitting layer 28 via an electrical distribution layer 30 (e.g., third layer). The electrical distribution layer 30 is broken into two or more portions such that power flow from the electrical distribution layer 30 into the light emitting layer 28 and then into a different portion of the electrical distribution layer 30. As show, the electrical distribution layer 30 includes a first portion 44, a second portion 46, and a third portion 48.

The first portion 44 contact both the light emitting layer 28 and the distribution layer 26. The first portion 44 is in contact with a side of the light emitting layer 28 (e.g., a side that extends between the a-side and the B-side). The first portion 44 of the electrical distribution layer 30 has a thickness equal to two layers. The first portion 44 extends above the second portion 46. The second portion 46 extends along and in contact with a B-side of the light emitting layer 28. The second portion 46 is a single thickness layer. The second portion 46 is disposed on an area of the light emitting layer 28 that is less than an area of the light emitting layer 28. The second portion 46 is spaced apart from the first portion 44 and the third portion 48. The third portion 48 is a mirror image to the first portion 44. The third portion 48 is in contact with both the distribution layer 26 and the light emitting layer 28. The third portion 48 contacts a side of the light emitting layer 28 and a B-side of the distribution layer 26. The electrical distribution layer 30 has regions with an absence of material 32.

The absence of material 32 may be a complete absence of material (e.g., be filled with air) or may be an absence of the electrical distribution layer 30 (e.g., may include material that does not conduct electricity). The absence of material 32 may be a region where material is removed, material was not applied, or a combination of both. The absence of material 32 does not conduct electricity (e.g., electricity does not flow through the absence of material 32). The absence of material 32 may be divided into a primary portion 32A that extends parallel to the other layers (e.g., distribution layer, light emitting layer, electrical distribution layer, dielectric layer, or a combination thereof). The absence of material 32 may be divided into a secondary portion 32B. The secondary portion 32B may extend from a first layer to a second layer, from the primary layer into a different plane, between sides of layers, from a layer with a first material to a layer with a second material, or a combination thereof. The secondary portion 32B may prevent electricity from extending from a length of the electrical distribution layer so that substantially an eternity of the light emitting layer illuminates. A dielectric layer 34 covers the electrical distribution layer 30. The dielectric layer 34 protects the electrical distribution layer 30. The dielectric layer 34 may prevent electricity from extending out of the light system 10, a short circuit, accidental contact, or a combination thereof. Electrodes extend through the dielectric layer 34 to provide power to the electrical distribution layer 30. The electrodes include a first electrode 36 connected to the first portion 44, a second electrode 38 connected to the second portion 46, and a third electrode 40 connected to the third portion 48. The electrodes 36, 38, and 40 are electrically connected to complete a circuit so that power flows 42 through the light emitting layer 28 to generate light. The electrodes 36, 38, and 40 may each include a wire 39 that provide or receive power.

Figure 3:
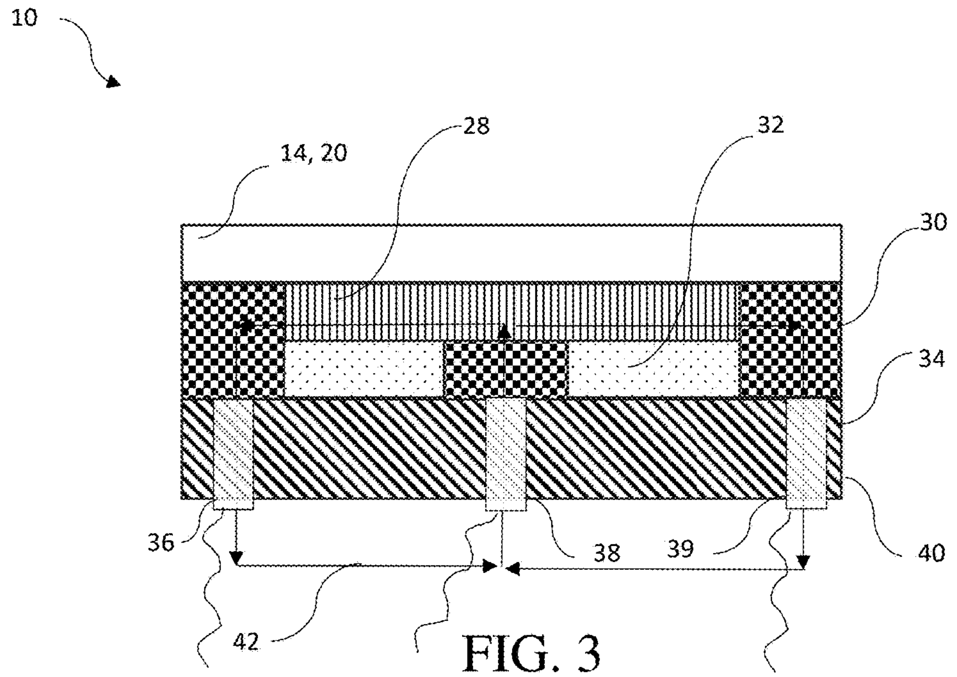
FIG. 3 illustrates a cross-sectional view of an illuminated component.

FIG. 3 illustrates a cross-sectional view of a light system 10. The light system 10 includes an outer lens 14 that forms a substrate 20. A rear side (e.g., B-side) of the substrate 20 is covered with a light emitting layer 28. The light emitting layer 28 is contacted on two surfaces by an electrical distribution layer 30. The electrical distribution layer 30 is divided into portions where the portions are spaced apart by an absence of material 32 that power does not flow through. The absence of material 32 is sufficiently small so that power moves from electrode 38, through the light emitting layer 28 and into the electrodes 36 and 40 respectively. The absence of material 32 is small enough that the power is able to jump from one electrode to another electrode through the light emitting layer 28. The electrical distribution layer 30 is covered by a dielectric layer 34 power flows 42 into and out of the electrical distribution layer 30 to power the electrical distribution layer 30 and produce light. The power flows 42 from a first portion of the electrical distribution layer into the light emitting layer 28 where the light emitting layer is illuminated by the electricity and then the power flows back into a second portion of the electrical distribution layer 30. Electrodes extend into contact with the dielectric layer 34 to provide power to the electrical distribution layer 30. The electrodes include a first electrode 36 connected to the first portion 44, a second electrode 38 connected to the second portion 46, and a third electrode 40 connected to the third portion 48. The electrodes 36, 38, and 40 are electrically connected to complete a circuit so that power flows 42 through the light emitting layer 28 to generate light. The electrodes 36, 38, and 40 may each include a wire 39 that provide or receive power.

Figure 4A:
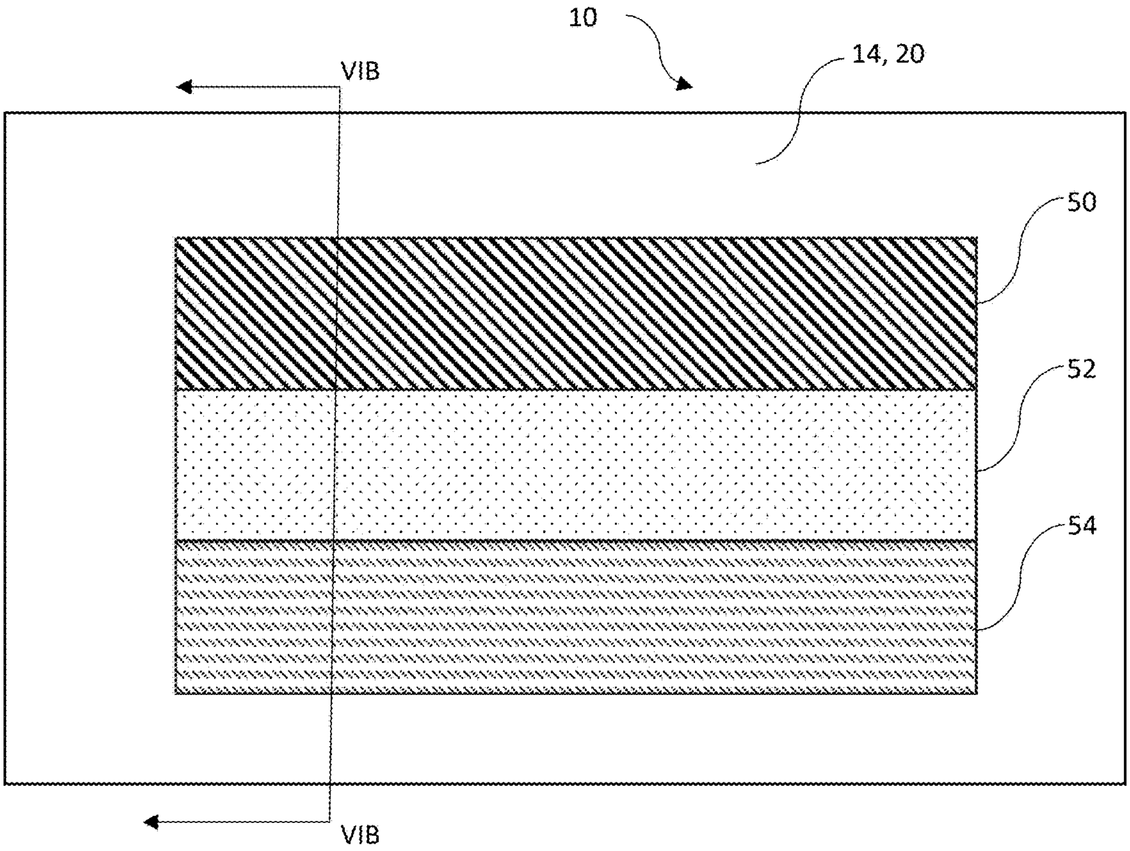
FIG. 4A is a top view of an illuminated component.

FIG. 4A is a top schematic view of a light system 10. The light system 10 includes an outer lens 14 that is also a substrate 20 that receives material on a back side of the substrate 20. The light system 10 is divides so that when powered the light system may generate a first light 50, a second light 52, and a third light 54. The first light 50, the second light 52, and the third light 54 may be different colors, shapes, materials, patterns, illumination times, or a combination thereof.

Figure 4B:
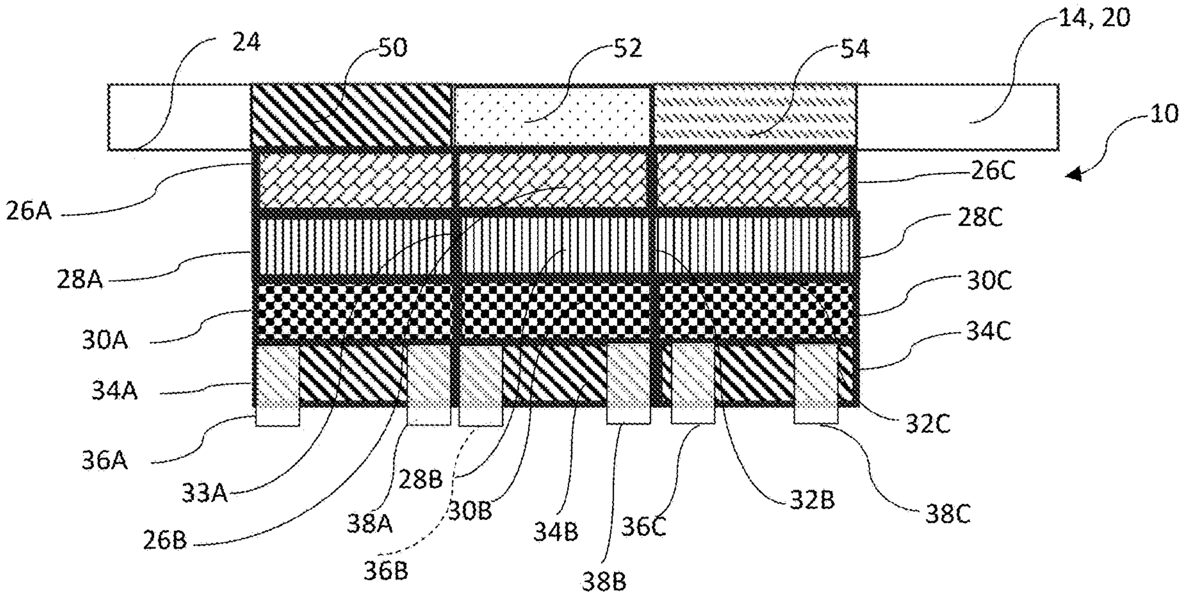
FIG. 4B is a cross-sectional view of the illuminated component of FIG. 4A.

FIG. 4B is a cross-sectional view of the light system 10 of FIG. 4A along line VIIB-VIIB. The light system 10 includes an outer lens 14 that forms a substrate 20. The outer lens 14 includes a B-side 24 that receives materials to form the light system 10. As shown, the outer lens 14 is illuminated with the first light 50, the second light 52, and the third light 54 so that the outer lens is illuminated individually as shown. The light system 10 includes three stacks of material that illuminate when powered. The first light 50 is generated by a distribution layer 26A, a light emitting layer 28A, an electrical distribution layer 30A, an absence of material 32A, and a dielectric layer 34A. The first light 50 is powered by a first electrode 36A and a second electrode 38A. The second light 50 is generated by a distribution layer 26B, a light emitting layer 28B, an electrical distribution layer 30B, an absence of material 32B, and a dielectric layer 34B. The second light 52 is powered by a first electrode 36B and a second electrode 38A. The third light 54 is generated by a distribution layer 26C, a light emitting layer 28C, an electrical distribution layer 30C, an absence of material 32C, and a dielectric layer 34C. The third light 54 is powered by a first electrode 36C and a second electrode 38C. Each of the first light 50, the second light 52, and the third light 54 act independently and are electrically discrete. The first light 50 is powered by a first electrode 36A and a second electrode 38A. The second light 52 is powered by a first electrode 36B and a second electrode 38B. The third light 54 is powered by a first electrode 36C and a second electrode 38C.

Figure 5:
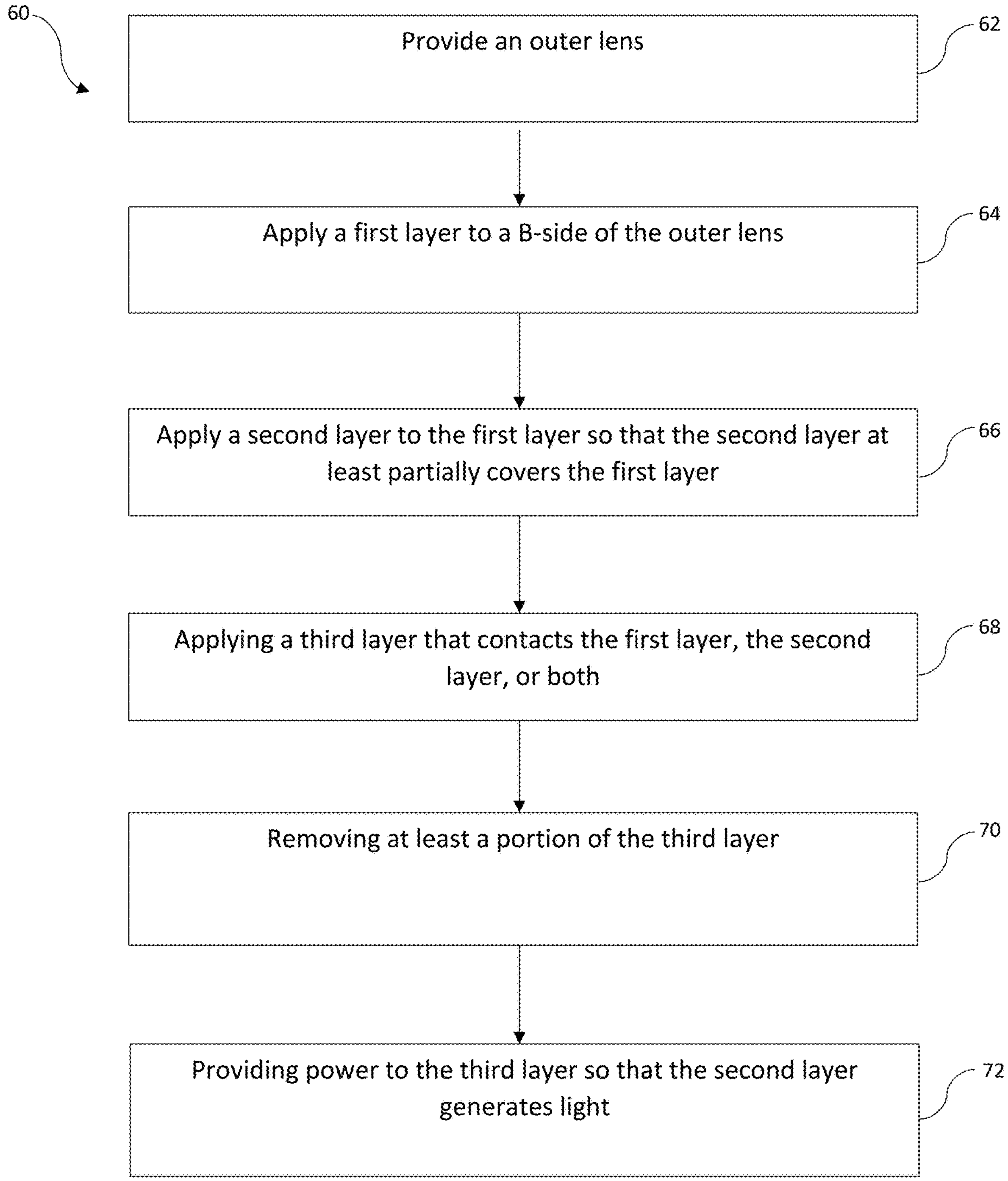
FIG. 5 illustrates a process of forming an illuminated component.

FIG. 5 illustrates a process of forming a light 60. The process of forming the light 60 begins by providing an outer lens 62. The outer lens 62 forms an outer most part of the light 60. A first layer is disposed to a back side of the outer lens 64. A second layer is disposed over the first layer 66 so that the first layer is at least partially covered by the second layer. A third layer is be disposed 68 such that the third layer is in contact with the first layer, the second layer, or both. At least a portion of the third layer is removed 70 so that portions of the third layer are spaced apart. Power is then applied to the third layer so that power flows through the second layer via the third layer to generate light 72.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or even consists of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

ELEMENT LIST

2 Vehicle
4 Fore
6 Aft
8 Controller
10 Light System
12 Illuminated Component
14 Outer Lens
16 Direction of Motion
18 Light Direction
20 Substrate
22 A-Side
24 B-Side
26 Distribution Layer
28 Light Emitting Layer
30 Electrical Distribution Layer
32 Absence of Material
32A Primary Portion
32B Secondary Portion
34 Dielectric Layer
36 First Electrode
38 Second Electrode
39 Wire
40 Third Electrode
42 Flow of Power
44 First Portion
46 Second Portion
48 Third Portion
50 First Light
52 Second Light
54 Third Light
60 Forming a Light
62 Provide a Lens
64 Apply a first layer to a b side
66 Apply a second layer
68 Apply a third layer to the first layer, the second layer, or both
70 Removing a portion of the third layer
72 Providing power to the third layer

We claim:

1. An illuminated component comprising:
an outer lens that forms an outside of the illuminated component;
a first layer configured as a distribution layer that is disposed on a back side of the outer lens opposite the outside of the illuminated component;
a second layer configured as a light emitting layer that is disposed on the first layer to at least partially cover the first layer;
a third layer configured as a dielectric layer that is disposed on the first layer and the second layer and the third layer is divided into a first portion and a second portion that are disconnected from one another;
a first electrode connected to the first portion; and
a second electrode connected to the second portion so that when power is applied, the power flows between the first electrode and the second electrode through the second layer so that the second layer generates light that is visible on an exterior of a vehicle housing the illuminated component.

2. The illuminated component of claim 1, wherein the outer lens is transparent.

3. The illuminated component of claim 1, wherein the first layer is discretely divided into two or more lights that are independently controllable.

4. The illuminated component of claim 1, wherein the illuminated component is a grille of the vehicle.

5. The illuminated component of claim 1, wherein the second layer includes phosphor.

6. The illuminated component of claim 1, further comprising:
a fourth layer that extends over the third layer and around the first electrode and the second electrode.

7. The illuminated component of claim 6, wherein the fourth layer is non-conductive, is a dielectric, or both.

8. The illuminated component of claim 1, wherein the illuminated component is free of a protective outer layer on the outside of the illuminated component.

9. The illuminated component of claim 1, wherein the first portion and the second portion are separated by an absence of material so that the first portion and the second portion are free of any direct contact or any indirect contact.

10. The illuminated component of claim 9, wherein the third layer includes or is made of metal that distributes the power through the second layer.

11. An illuminated component comprising:
an outer lens configured to extend outside of a vehicle when the illuminated component is connected to the vehicle;
a first layer configured as a distribution layer that is disposed on a back side of the outer lens so that the back side faces an interior of the vehicle when the illuminated component is connected to the vehicle;
a second layer configured as a light emitting layer that is disposed on the first layer to partially or entirely cover the first layer;
a third layer configured as a dielectric layer comprising:
two or more portions that include a first portion and a second portion that are disconnected from one another, with the two or more portions being disposed on and in contact with a surface of the second layer and the first layer, or both;
a first electrode connected to the first portion; and
a second electrode connected to the second portion and electrically connected to the first electrode to complete a circuit so that when power is applied, the power flows between the first portion and the second portion through the second layer to illuminate the second layer and provide light.

12. The illuminated component of claim 11, wherein the first portion of the third layer contacts a side of the second layer that is perpendicular to the back side of the outer lens.

13. The illuminated component of claim 12, wherein third coating contacts a back side of the second layer that is parallel to the back side of the outer lens.

14. The illuminated component of claim 12, wherein the power flows from a rear side of the illuminated component towards a forward side of the illuminated component to electrify the second layer.

15. The illuminated component of claim 14, wherein the power flows into a back side of the second layer to electrify the second layer.

16. The illuminated component of claim 11, further comprising:

a fourth layer that covers the third layer and extends around the first electrode and the second electrode.

17. The illuminated component of claim 11, wherein the illuminated component is powered with pule width modulation.

18. A process comprising:

applying a first layer, configured as a distribution layer, to a back side of an outer lens;

applying a second layer, configured as a light emitting layer, to a back side of all or a portion of the first layer;

applying a third layer, configured as a dielectric layer, to both the first layer and the second layer or both such that the third layer comprises two or more portions that are disconnected from one another;

connecting a first electrode to a first portion of the two or more portions; and connecting a second electrode to a second portion of the two or more portions to form an illuminated component, and wherein the second layer is powered by power extending from the first electrode to the second electrode through the third layer to emit light.

19. The process of claim 18, wherein the two or more portions are formed by removing a portion of the third layer.

20. The process of claim 18, further comprising:

connecting the illuminated component to a vehicle so that the illuminated component extends into the vehicle and the outer lens is an only part of the illuminated component that is located outside of the vehicle.

* * * * *